US006196643B1

(12) United States Patent
Yokoyama et al.

(10) Patent No.: US 6,196,643 B1
(45) Date of Patent: Mar. 6, 2001

(54) BRAKE CONTROL APPARATUS (75) Inventors: Satoshi Yokoyama, Nishio; Kenji Tozu, Yokkaichi; Masanobu Fukami, Aichi-ken; Takayuki Itoh, Nagoya, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/220,599

(22) Filed: Dec. 28, 1998

(30) Foreign Application Priority Data

Dec. 25, 1997 (JP) .................................................. 9-356974

(51) Int. Cl.⁷ ........................................................ B60T 8/32
(52) U.S. Cl. ......................... 303/166; 303/116.2; 303/155
(58) Field of Search ..................... 303/DIG. 3, DIG. 4, 303/116.2, 113.4, 116.1, 10, 11, 166, 155

(56) References Cited

U.S. PATENT DOCUMENTS

| | | | |
|---|---|---|---|
| 4,807,941 | * | 2/1989 | Onogi et al. .......................... 303/166 |
| 5,188,437 | | 2/1993 | Willmann . |
| 5,205,623 | | 4/1993 | Holzmann et al. . |
| 5,487,593 | * | 1/1996 | Potts et al. .............................. 303/11 |
| 5,553,929 | * | 9/1996 | Rivard et al. .................... 303/DIG. 4 |
| 5,586,814 | * | 12/1996 | Steiner ............................... 303/116.2 |
| 5,607,209 | | 3/1997 | Narita et al. . |
| 5,709,438 | * | 1/1998 | Isakson ................................ 303/166 |
| 5,727,852 | | 3/1998 | Pueschel et al. . |
| 5,779,328 | * | 7/1998 | Mergenthaler et al. ............... 303/11 |
| 5,931,545 | * | 8/1999 | Yonemura et al. ................... 303/155 |
| 5,951,120 | * | 9/1999 | Shimura et al. ...................... 303/166 |

FOREIGN PATENT DOCUMENTS

| | | |
|---|---|---|
| 40 35 527 | 5/1992 | (DE) . |
| 195 01 760 | 7/1996 | (DE) . |
| 195 25 800 | 1/1997 | (DE) . |
| 196 15 805 | 10/1997 | (DE) . |
| 2 297 134 | 7/1996 | (GB) . |
| 2 326 452 | 12/1998 | (GB) . |
| 5-116609 | 5/1993 | (JP) . |
| 7-329766 | 12/1995 | (JP) . |
| 8-230634 | 9/1996 | (JP) . |
| 9-254773 | 9/1997 | (JP) . |

* cited by examiner

Primary Examiner—Matthew C. Graham
(74) Attorney, Agent, or Firm—Burns, Doane, Swecker & Mathis, LLP (57) ABSTRACT

A brake control apparatus includes a first valve to open and close a main line between a master cylinder and a wheel cylinder, a pump connected between a first valve and the wheel cylinder to supply pressurized brake fluid to the wheel cylinder, an auxiliary line connecting the inlet side of the pump to a master cylinder, a second valve to open and close the auxiliary line, a pressure sensor to detect the output pressure of the master cylinder and an electronic control unit which controls the first valve, the second valve, and the pump based upon the pressure detected by the pressure sensor so that the wheel cylinder receives a higher pressure than that of the master cylinder. The electronic control unit also closes the second valve while the pressure sensor detects the pressure over a certain pressure determined by the road surface condition.

8 Claims, 9 Drawing Sheets

BRAKE CONTROL APPARATUS

This application corresponds to and claims priority under 35 U.S.C. §119 with respect to Japanese Application No. 09(1997)-356974 filed on Dec. 25, 1997, the entire content of which is incorporated herein by reference.

FIELD OF THE INVENTION

The present invention generally relates to a brake control apparatus. More particularly, the present invention pertains to a brake control apparatus that increases or boosts the braking force when the driver applies a rapid or deep depressing force to the brake pedal.

BACKGROUND OF THE INVENTION

Under emergency situations, a driver may rapidly depress a brake pedal. However, the driver may not depress the brake pedal sufficiently or the driver may not maintain a sufficient force for a necessary period of time. Thus, to improve vehicle safety, some automatic brake assisting systems have been introduced in the market. Such known brake assisting systems employ a vacuum booster to automatically boost the braking force when the driver depresses the brake pedal rapidly.

Japanese Laid-Open Patent Publication No. H08-230634 published on Sep. 10, 1996, which corresponds to U.S. Pat. No. 5,727,852, discloses a brake assisting system. In the brake system described in this publication, a pump for anti-skid control or traction control is also used for boosting braking force in order to reduce the role of the vacuum booster. The system includes a wheel cylinder, a master cylinder, a main line connecting the master cylinder to the wheel cylinder, a modulator disposed in the main line to control pressure in the wheel cylinder, a reservoir connected to the wheel cylinder through the modulator, a first valve that opens and closes the main line between the master cylinder and the modulator, a pump connected between the reservoir and the wheel cylinder to supply pressurized brake fluid from the reservoir to the wheel cylinder, an auxiliary line connecting the inlet side of the pump to the master cylinder, and a second valve that opens and closes the auxiliary line.

Further, this known system also includes a pressure sensor to detect the output pressure from the master cylinder. The pump, the first valve and the second valve perform brake assistance under a proper control while the output pressure and/or the pressure increase ratio exceeds the predetermined value. To increase the pressure, the first valve is opened and the second valve is closed. Then, the pressure increase rate is controlled by turning the pressure pump on and off.

However, this system may suffer from disadvantages and drawbacks related to the performance of anti-skid control because the second valve is opened to increase the brake pressure.

During the brake assist control, the output pressure from the master cylinder is larger than the pressure stored in the reservoir because the driver has strongly depressed the brake pedal. Accordingly, the pump may discharge a lesser amount of brake fluid from the reservoir while the second valve is closed. Therefore, the reservoir may become full during a pressure decreasing period of the anti-skid control because the pump may not discharge all the brake fluid flowing into the reservoir.

In light of the foregoing, a need exists for a brake control apparatus that is not susceptible to the same disadvantages and drawbacks as those discussed above.

It would thus be desirable to provide a brake control apparatus that is able to simultaneously perform brake assist control and anti-skid control.

It would also be desirable to provide a brake control apparatus that is able to discharge brake fluid from a reservoir during anti-skid control.

SUMMARY OF THE INVENTION

The present invention provides a brake control apparatus that includes a wheel cylinder to apply brake for a wheel a master cylinder to generate pressurized brake fluid in accordance with the operation of a brake pedal, a main line connecting the master cylinder to the wheel cylinder, a modulator disposed in the main line to control pressure in the wheel cylinder, a reservoir connected to the wheel cylinder through the modulator, a first valve to open and close the main line between the master cylinder and the modulator, a pump connected between the reservoir and the wheel cylinder to supply pressurized brake fluid from the reservoir to the wheel cylinder, and an auxiliary line connecting the inlet side of the pump to the master cylinder. A second valve opens and closes the auxiliary line, and a pressure sensor detects the output pressure of the master cylinder. A controller controls the first valve, the second valve and the pump based upon the pressure detected by the pressure sensor so that the wheel cylinder receives a higher pressure than that of the master cylinder. Further, the controller closes the second valve when the pressure sensor detects the pressure over a certain pressure determined by the road surface condition.

The pressure sensor may be replaced by a deceleration sensor to detect the deceleration of the vehicle body, a brake force sensor or a slip rate sensor to detect the slip rate between the wheel and the road surface. Further, the certain pressure may be assumed from the deceleration of the vehicle body, the brake force or the slip rate.

According to the present invention, the controller closes the second valve while the pressure sensor detects the pressure over a certain pressure determined by the road surface condition. Therefore, brake fluid can be discharged from the reservoir while the brake assistance control and the anti-skid control are simultaneously performed.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENT

Figure 1:
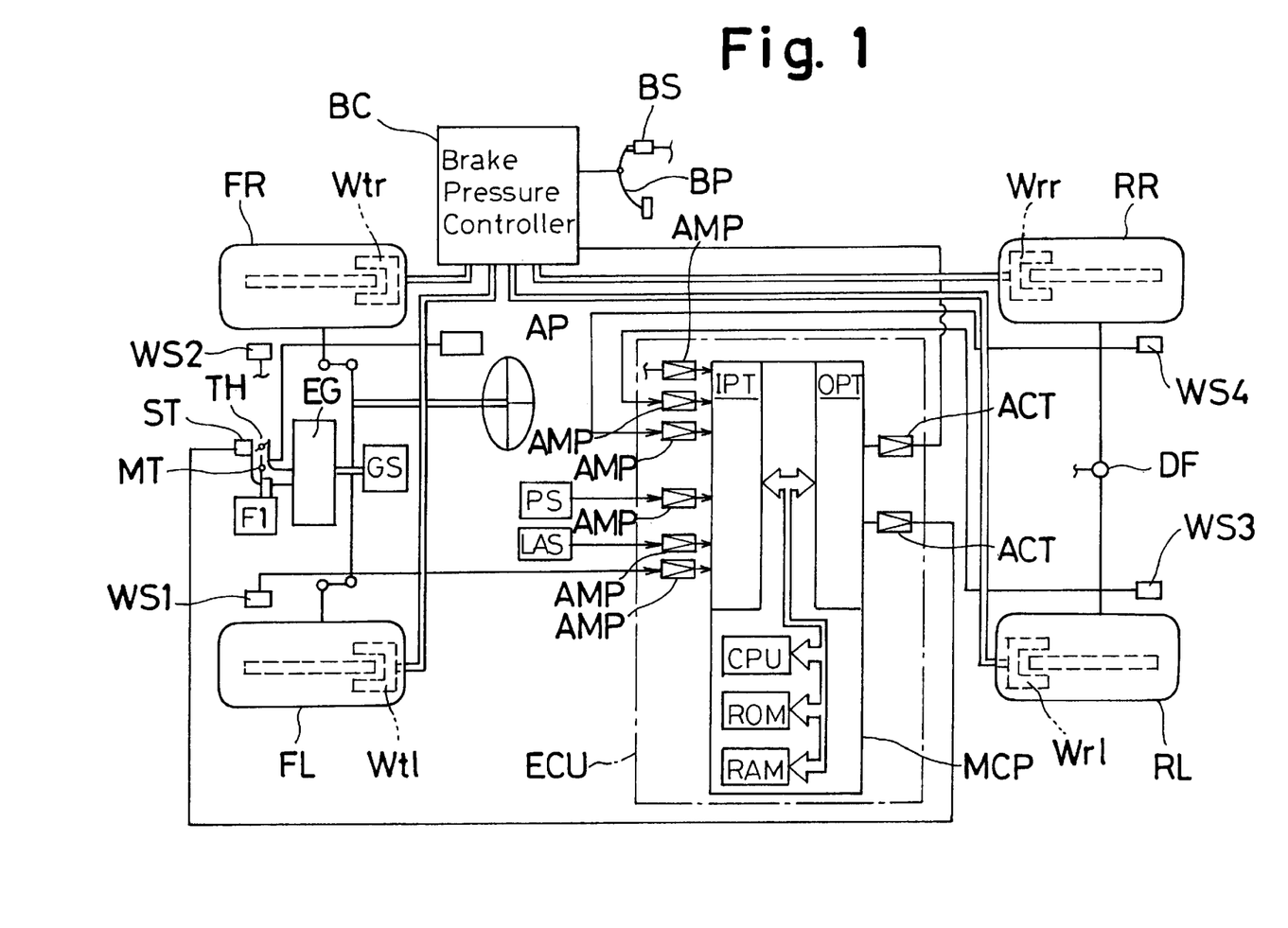
FIG. 1 is a schematic block diagram of the overall brake system according to the present invention.

With reference initially to FIG. 1, the system according to the present invention includes an internal combustion engine EG connected to a throttle controller TH and a fuel injector FI. The throttle controller TH controls a main throttle valve MT and a sub-throttle valve ST. The main throttle valve MT is controlled in accordance with the driver's operation of the accelerator pedal AP. The sub-throttle valve ST is controlled by an electronic control unit ECU. The electronic control unit ECU also controls the fuel injector Fl to adjust the amount of fuel supplied to the internal combustion engine EG. In this embodiment, the internal combustion engine EG drives the rear wheels RR, RL through a drive train GS and a differential gear DF. In other words, this embodiment employs a so called rear wheel drive unit. However, it is to be understood that the invention is equally applicable to other drive systems, such as front wheel drive systems and all wheel drive systems.

The right and left front wheels FR, FL include respective wheel cylinders Wfr, Wfl. The right and left rear wheels RR, RL also include respective wheel cylinders Wrr, Wrl. All the wheel cylinders Wfr, Wfl, Wrr, Wrl are hydraulically connected to a brake pressure controller BC. Additional details associated with the brake pressure controller BC will be explained below with reference to FIG. 2.

Figure 2:
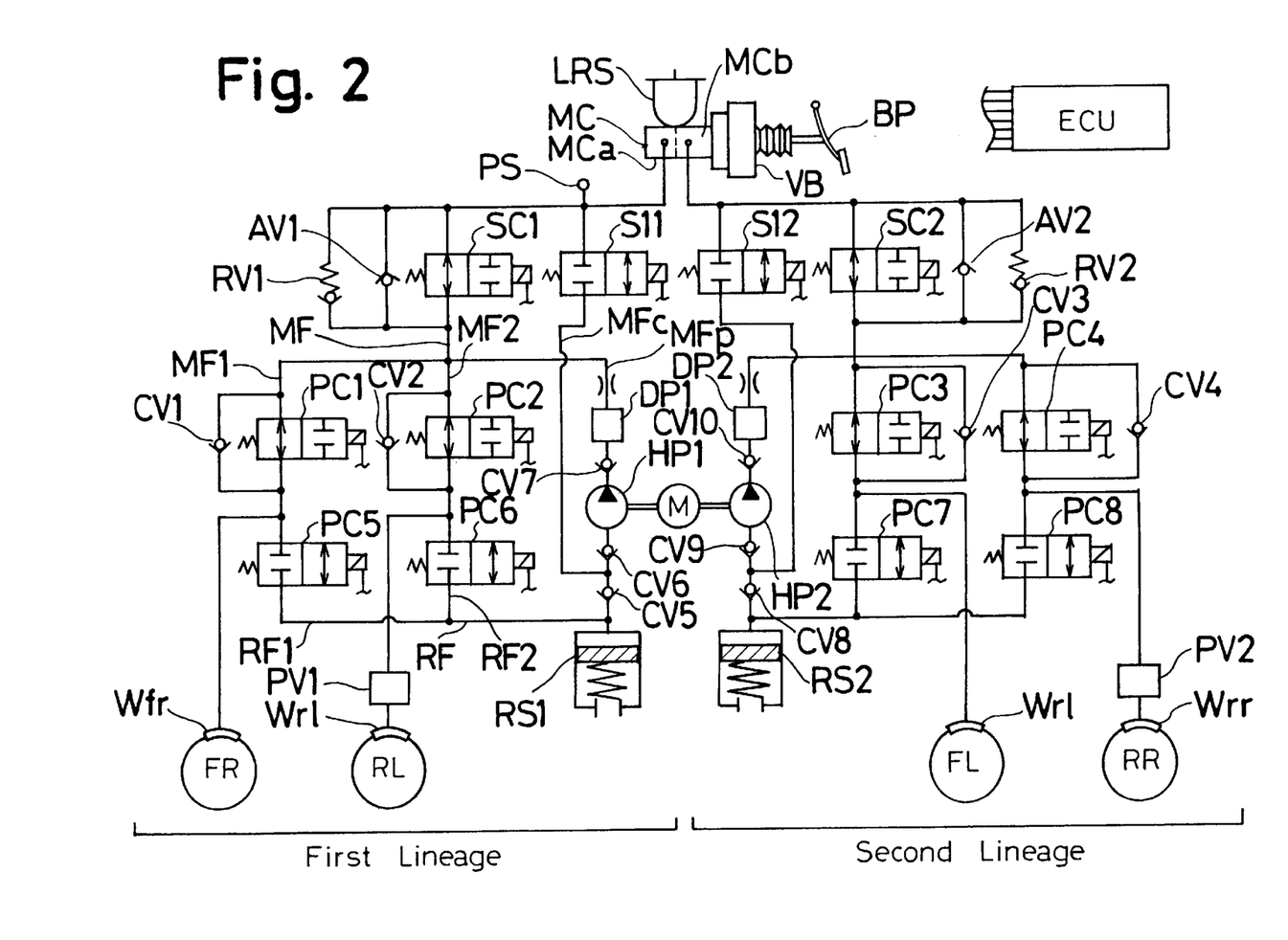
FIG. 2 is a circuit diagram showing a brake fluid circuit according to the present invention.

Each of the wheels FR, FL, RR, RL includes a respective wheel speed sensor WS1, WS2, WS3, WS4. These speed sensors WS1, WS2, WS3, WS4 are all electrically connected to the electronic control unit ECU to supply pulse signals to the electronic control unit ECU representing individual speeds of the respective wheels FR, FL, RR, RL. Further, the brake pressure controller BC includes a master cylinder MC and a pressure sensor PS which are shown in FIG. 2. The pressure sensor PS detects the output pressure Pmc from the master cylinder MC. The pressure sensor PS is electrically connected to the electronic control unit ECU to supply a signal indicative of the output pressure Pmc to the electronic control unit ECU.

As further seen in FIG. 2, the master cylinder MC is mechanically connected to a brake pedal BP to receive the force from a operation of the brake pedal by a driver. The brake pedal BP is equipped with a brake switch BS as shown in FIG. 1. The brake switch BS is turned on when the driver depresses the brake pedal BP. The brake switch BS supplies an electric signal to the electronic control unit ECU representing that brake pedal operation by the driver.

The electronic control unit ECU receives signals from a steering angle sensor (not shown) to detect the steering angle of the front wheels FR, FL. Further, the electronic control unit ECU receives signals from a lateral acceleration sensor LAS to detect lateral acceleration Gy of a vehicle and a yaw rate sensor (not shown) to detect the yaw rate of the vehicle.

As seen with reference to FIG. 1, the electronic control unit ECU includes a micro computer MCP. The micro computer MCP further includes a central processing unit CPU, read only memories ROM, random access memories RAM, input ports IPT and output ports OPT. Various signals are amplified by amplifiers AMP and are fed to the central processing unit CPU from the wheel speed sensors WS1, WS2, WS3, WS4, the pressure sensor PS, the brake switch BS, the steering angle sensor, the yaw rate sensor and the lateral acceleration sensor LAS. Further, various signals are supplied from the central processing unit CPU to the throttle controller TH and the brake pressure controller BC through drivers ACT.

The micro computer MCP executes the programs shown in FIGS. 3, 4, 5, 7 and 8 while the ignition switch is closed to run the internal combustion engine EG. These programs are stored in the read only memories ROM. The micro computer MCP temporally stores variables in the random access memories RAM to-execute the programs. Of course, multiple micro computers can be employed for various tasks defined by the programs.

FIG. 2 is a circuit diagram showing the brake pressure controller BC. The master cylinder MC is driven by a vacuum booster VB in accordance with the driver's operation of the brake pedal BP. When the driver operates the brake pedal BP, the master cylinder MC pressurizes brake fluid stored in a master reservoir LRS and supplies the pressurized brake fluid to a first line and a second line. The first line connects a first pressure chamber MCa of the master cylinder MC to the front right and rear left wheel cylinders FR, RL. The second line connects a second pressure chamber MCb of the master cylinder MC to the front left and rear right wheel cylinders FL, RR. In this embodiment, the master cylinder MC is a tandem type master cylinder, and the first and second lines constitutes a diagonal type hydraulic braking system.

In the first line for wheel cylinders Wfr, Wrl, the first pressure chamber MCa is connected to a main flow passage MF. The main flow passage MF branches off into two branch passages MF1 and MF2. One of the branch passages MF1 is connected to the wheel cylinder Wfr while the other branch passage MF2 is connected to the wheel cylinder Wrl. An open/close valve SC1 is located in the main flow passage MF. The valve SC1 is so called a cut valve and is normally opened. Further, the first pressure chamber MCa is connected to a pair of one-way valves CV5, CV6 through an auxiliary flow passage MFc. The pressure sensor PS is connected to the auxiliary flow passage MFc to detect the output pressure Pmc from the master cylinder MC. To detect that the driver is operating the brake pedal BP, the pressure sensor PS may be used instead of the brake switch BS. It is also within the purview of the present invention to use a brake stroke sensor instead of the brake switch BS.

An open/close valve PC1 is located in the branch passage MF1 and an open/close valve PC2 is located in the branch passage MF2. These valves PC1, PC2 are normally open type valves. In addition, a one-way valve CV1 is provided in parallel to the valve PC1 and a one-way valve CV2 is provided in parallel to the valve PC2. These one way valves CV1, CV2 only allow brake fluid to flow toward the mater cylinder MC. The brake fluid in the wheel cylinders Wfr, Wrl is returned to the master cylinder MC and the master cylinder reservoir LRS through the one way valves CV1, CV2 and the valve SC1. Accordingly, upon the driver's release of the brake pedal BP, the pressure in the wheel cylinders Wfr, Wrl may quickly follow the decreasing output pressure Pmc from the master cylinder MC. The wheel cylinder Wfr is also connected to a return flow branch passage RF1 through an open/close valve PC5. Similarly, the wheel cylinder Wrl is connected to a return flow branch passage RF2 through an open/close valve PC6. The valves FC5, PC6 are normally closed type valves, and the branch passages RF1, RF2 are joined to a return flow passage RF. The return flow passage RF is connected to an auxiliary reservoir RS1.

An inlet port of a hydraulic pump HP1 is connected to the auxiliary reservoir RS1 through the one way valves CV6, CV5. The outlet port of the hydraulic pump HP1 is connected to the valves PC1, PC2 through a one-way valve CV7 and a fluid passage MFp. The hydraulic pump HPI is driven by an electric motor M to draw in brake fluid from the inlet port and supply pressurized brake fluid from the outlet port. The electric motor M serves as a common drive for a second hydraulic pump HP2 which is operatively associated with the second line. The auxiliary reservoir RS1 is referred to as an accumulator and is independent from the master cylinder reservoir LRS. The auxiliary reservoir RS1 includes a movable piston and a spring so that a predetermined amount of brake fluid may be temporarily conserved or stored in the auxiliary reservoir RS1.

The master cylinder MC is connected to the one-way valves CV5, CV6 through the auxiliary flow passage MFc. The one-way valve CV5 cuts off the flow of brake fluid from the master cylinder MC to the auxiliary reservoir RS1 but allows the counter flow of brake fluid from the auxiliary reservoir RS1 to the master cylinder MC. The one-way valves CV6, CV7 allow brake fluid flow from the inlet port to the outlet port of the hydraulic pump HP1. The one-way valves CV6, CV7 are typically integrated with the hydraulic pump HP1. An open/close valve SI1 is located in the auxiliary flow passage MFc. The valve SI1 is normally closed to cut off the master cylinder MC from the inlet port of the hydraulic pump HP1. That is, the inlet port of the hydraulic pump HP1 is connected to the master cylinder MC while the valve SI1 is opened by the electronic control unit ECU.

A relief valve RV1 and one-way valve AV1 are connected in parallel to the valve SC1. To adjust the output pressure from the hydraulic pump HP1, the relief valve RV1 cuts off brake fluid flowing from the master cylinder MC to the valves PC1, PC2, but allows the counter flow of brake fluid when a pressure difference between the main flow passage MF and the master cylinder MC exceeds a predetermined value. The one-way valve AV1 allows brake fluid flow toward the wheel cylinders Wfr, Wrl but cuts off the counter flow of brake fluid. Due to the one-way valve AV1, upon the drivers depression of the brake pedal BP, pressure is increased in the wheel cylinders Wfr, Wrl even while the valve SC1 is closed. In addition, a dumper DP1 is disposed at the outlet for the second line and a proportioning valve PV1 is disposed before the inlet port of the rear wheel cylinder Wrl.

The second line for the wheels cylinders Wfl, Wrr consists of the same elements and fluid circuit as the first line described above. The second line includes an auxiliary reservoir RS2 similar to the auxiliary reservoir RS1, a dumper DP2 similar to the dumper DP1, a proportioning valve PV2 similar to the proportioning valve PV1, a normally open valve SC2 similar to the normally open valve SC1, a normally closed valve SI2 similar to the normally closed valve SI1, several valves PC3, PC4, PC7, PC8 similar to the valves PC2, PC1, PC6, PC5, one-way valves CV3, CV4, CV8, CV9, CV10 similar to the one-way valves CV2, CV1, CV5, CV6, CV7, and a relief valve RV2 and one-way valve AV2 similar to the relief valve RV1 and one-way valve AV1. The second hydraulic pump HP2 is driven together with the first hydraulic pump HP1 by the common electric motor M.

The electronic control unit ECU controls the electric motor M, the valves SC1, SC2, SI1, SI2 and valves PC1, PC2, PC3, PC4, PC5, PC6, PC7, PC8 to perform brake assist control, anti-skid control, vehicle stability control (i.e., oversteer/under-steer reduction control), front and rear braking force distribution control and traction control. The electronic control unit ECU executes the programs shown in FIGS. 3, 4, 5, 7 and 8 while the ignition switch (not shown) is closed by the driver.

Figure 3:
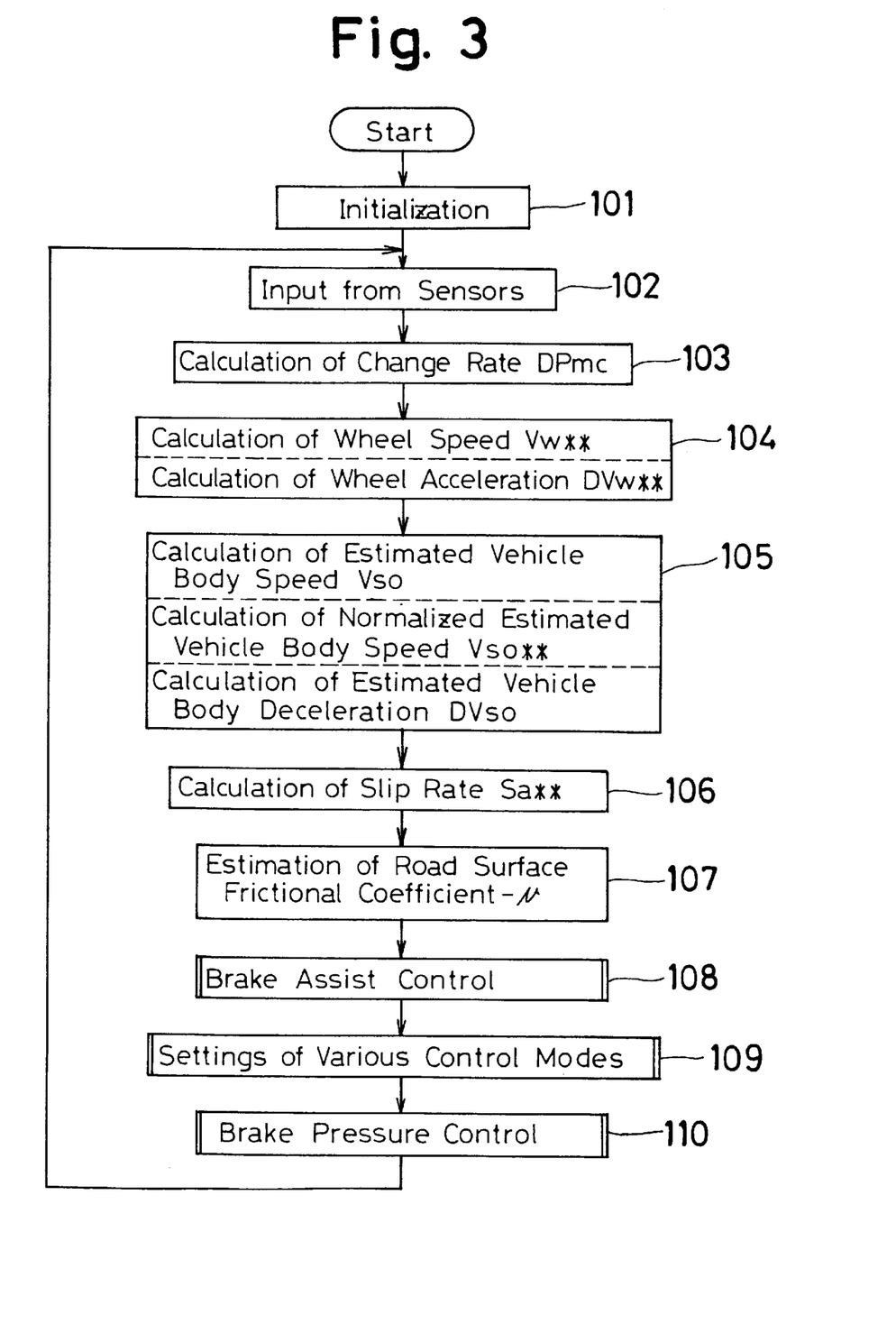
FIG. 3 is a flow chart showing the overall control according to the present invention.

FIG. 3 is a general flow chart showing the overall control according to the present invention. At step 101, the microcomputer MCP is initialized to clear variables and reset the input and output ports. At step 102, signals are received from the wheel speed sensors WS1, WS2, WS3, WS4 and the pressure sensor PS. At step 102, signals are also received from the steering angle sensor, the yaw rate sensor and the lateral acceleration sensor LAS.

At step 103, the output pressure Pmc from the master cylinder MC is differentiated so that a change rate DPmc of the output pressure Pmc is calculated. At step 104, each wheel speed $Vw^{}$ is calculated. The use of the characters "" in the following description refers to one of the wheels FR, FL, RR, RL. Further, at the step 104, each wheel speed $Vw^{}$ is differentiated to calculate each wheel acceleration $DVw^{}$. At step 105, an estimated vehicle body speed Vso is calculated at the center of gravity of the vehicle body through use of the formula: $Vso=MAX(Vw^{})$. In other words, the estimated vehicle body speed is equal to the largest wheel speed $Vw^{}$. At step 105, respective estimated vehicle body speeds $Vso^{}$ are calculated at positions for each of the wheels FR, FL, RR, RL. Further, if necessary, the respective vehicle body speeds $Vso^{}$ may be normalized to reduce errors due to a turn of the vehicle body. Furthermore, at step 105, a vehicle body deceleration DVso in the fore-aft direction of the vehicle body is calculated at the center of gravity of the vehicle body. The vehicle body deceleration DVso is determined by differentiating the estimated vehicle body speed Vso. It is to be understood that the vehicle body deceleration means the same thing as the vehicle body acceleration except for a difference in sign.

At step, 106, a slip rate $Sa^{}$ for each wheel FR, FL, RR, RL is calculated based on each wheel speed $Vw^{}$ and each body speed $Vso^{}$ (or the normalized vehicle body speed) through use of the formula: $Sa^{}=(Vso^{}-Vw^{})/Vso^{}$. At step 107, a road surface frictional coefficient $\mu$ is approximately estimated based on the vehicle body deceleration DVso and the lateral acceleration Gy through use of the formula: $\mu=(DVso^2+Gy^2)^{1/2}$. It is also possible to estimate the road surface frictional coefficient $\mu^{}$ for each wheel FR, FL, RR, RL based on the road surface frictional coefficient $\mu$ and each estimated wheel cylinder pressure $Pw^{**}$.

At step 108, the brake assist control is performed, the details of which are described below in more detail. At step 109, various control modes and target slip rates are set to perform brake assist control, anti-skid control, vehicle stability control (i.e., over-steer/under-steer reduction control), front and rear braking force distribution control and traction control. At step 110, the hydraulic pressures are controlled by the brake pressure controller BC so that the braking forces are controlled at the wheels FR, FL, RR, RL. For brake assist control, the brake pressure controller BC controls the electric motor M and the valves SC1, SC2, SI1, SI2.

Figure 4:
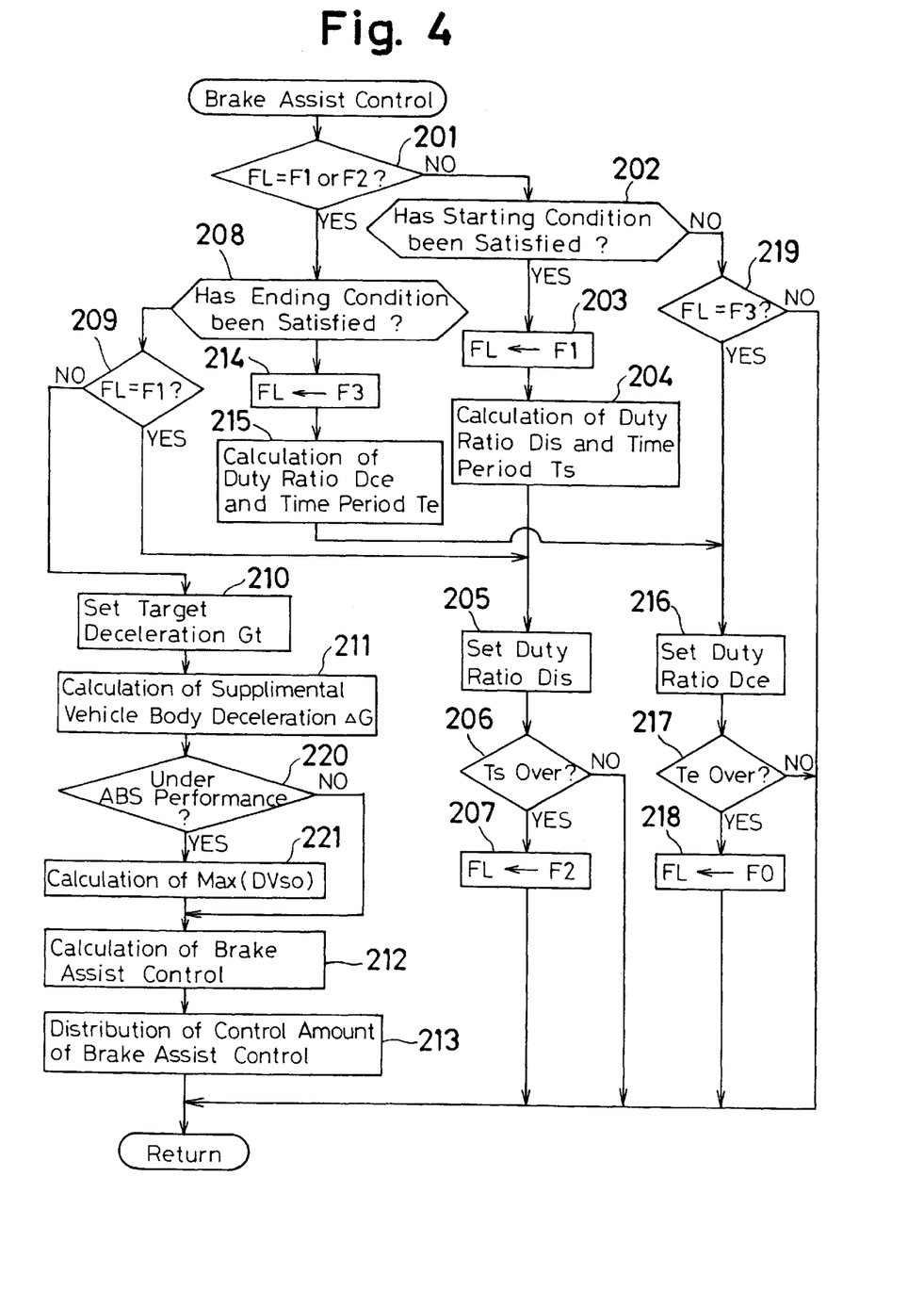
FIG. 4 is a flow chart illustrating the brake assist control step which forms a part of the flow chart in FIG. 3.

Referring to FIG. 4, the brake assist control set forth in step 108 of FIG. 3 is further explained. At step 201, a brake assist control flag FL is checked. Unless the brake assist control flag FL is equal to an initiation flag F1 or a working flag F2, step 202 is executed. Here, the flag F1 represents that the brake assist control has already started but is in an initial time period. The flag F2 represents that the brake assist control is actively working.

Figure 9:
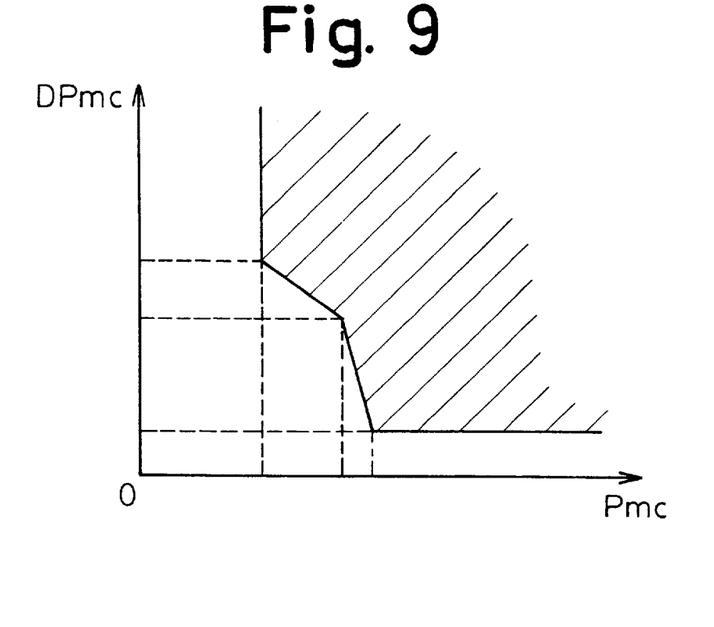
FIG. 9 is a graph showing a start area for brake assist control in FIG. 3.

At step 202, the electronic control unit ECU judges if the starting condition for brake assist control has been satisfied. If the starting condition is satisfied at step 202, step 203 is executed to set the control flag FL to the initiation flag F1. Here, the brake assist control starts under the cross-hatched area in FIG. 9 where (a) the output pressure Pmc from the master cylinder MC exceeds certain values and (b) the change rate DPMC of the output pressure Pmc exceed certain rates.

At step 204, the electronic control unit ECU determines a duty ratio Dis for the valves SI1, SI2 and a time period Ts for the initial time period. The duty ratio Dis is selected from a map depending on the output pressure Pmc from the master cylinder MC and the change rate DPMC of the output pressure Pmc. The duty ratio Dis increases or gets larger as the output pressure Pmc increases or gets larger. The duty ratio D also increases or gets larger as the change rate DPMC increases or gets larger. Further, the time period Ts is set to either the shorter one of (c) a time period for supplying a target amount Vc of brake fluid to the wheel cylinders Wfr, Wfl, Wrr, Wrl or (d) a constant time period Tc (e.g., 1 second). The time period for supplying the target amount Vc of brake fluid may be determined by the duty ratio Dis of the valves SI1, SI2 and the discharge amount VP of the hydraulic pumps HP1, HP2 during a unit time.

At step 205, the electronic control unit ECU sets the duty ratio Dis to the value resulting from step 204 for the valves SI1 and SI2. The electronic control unit ECU also sets another duty ratio to 100% for the valves SC1 and SC2 at step 205. At step 206, the electronic control unit ECU judges if the time period Ts has elapsed. If the time period Ts has not yet elapsed, the electronic control unit ECU returns to the main routine shown in FIG. 3. Otherwise, the electronic control unit ECU executes step 207 to set the control flag FL to the working flag F2. After step 207, the electronic control unit ECU returns to the main routine shown in FIG. 3.

If the flag FL is equal to the initiation flag F1 or the working flag F2 at step 201, step 208 is executed. At step 208, the electronic control unit ECU judges if at least one of the ending conditions for brake assist control has been satisfied. Here, the ending conditions are: (e) the brake switch BS is turned off (i.e., the driver releases the brake pedal BP); or (f) the estimated vehicle body speed Vso is less than a certain value at the center of gravity of the vehicle body; or (g) the output pressure Pmc is less than a certain pressure Pa (e.g., 1 mega-PASCAL); or (h) the output pressure Pmc exceeds a certain pressure Pb where the certain pressure Pb represents the minimum pressure to lock any wheel on a normal (or nonslippery) road surface. At step 208, if none of the ending conditions is satisfied, the electronic control unit ECU executes step 209 to judge the condition of the control flag FL. At step 209, if the control flag is equal to the initiation flag F1, the electronic control unit ECU executes steps 205, 206 and 207 as described above. At step 209, if the control flag FL is equal to the working flag F2, the electronic control unit ECU proceeds to step 210.

At the step 210, the electronic control unit ECU sets a target deceleration Gt. The electronic control unit ECU first determines a vehicle body deceleration Gm based on the output pressure Pmc of the master cylinder MC. Then, the electronic control unit ECU selects one of constant decelerations $\Delta g$ for the brake assist control in accordance with the output pressure Pmc of the master cylinder MC to add the selected constant deceleration $\Delta g$ to the vehicle body deceleration Gm. In other words, the target deceleration Gt is the sum of the vehicle body deceleration Gm and the selected constant deceleration $\Delta g$, which means that the target deceleration Gt is set in accordance with the output pressure Pmc of the master cylinder MC. At step 211, the electronic control unit ECU calculates the difference between the target deceleration Gt and the vehicle body deceleration DVso which is referred to herein as a supplemental vehicle body deceleration $\Delta G$.

At step 220, the electronic control unit ECU judges whether or not the anti-skid control is being performance. If anti-skid control is being performed, step 221 is executed to calculate the maximum value MAX(DVso) of the vehicle body deceleration DVso. In other words, the electronic control unit ECU calculates the maximum vehicle body deceleration MAX (DVso) within a predetermined time period (e.g., 500 millisecond). Such vehicle body deceleration DVso is related to the brake fluid pressure and a peak road surface frictional coefficient $\mu$. It is also possible to use an acceleration sensor to directly detect the maximum value of the vehicle body deceleration DVso along the fore-aft direction of the vehicle body. Also, it is possible to covert the estimated wheel cylinder pressure to the vehicle body deceleration DVso from which the maximum value of the vehicle body deceleration DVso is obtained. Furthermore, it is possible to calculate the maximum value of the wheel cylinder pressure.

After completing step 221 or in the event it is determined in step 220 that anti-skid control is not being performed, step 212 is executed to calculate a control amount of the brake assistance in accordance with the supplemental vehicle body deceleration $\Delta G$. At step 213, the control amount of the brake assistance is distributed to the wheels FR, FL, RR, RL. By this distribution, the braking force and the target slip rate is properly adjusted for each wheel FR, FL, RR, RL to maintain stable vehicle dynamics.

In case the electronic control unit ECU determines in step 208 that one of the ending conditions for brake assist control has been satisfied, step 214 is executed to set the control flag FL to a termination flag F3. At step 215, the electronic control unit ECU determines a duty ratio Dce for the valves SC1, SC2 and a time period Te for the termination period. The duty ratio Dce is selected from a map depending on the decreasing change rate DPMC of the output pressure Pmc. The duty ration Dce increases or gets larger as the decreasing change rate DPMC increases or gets larger. Further, the time period Te is set to a constant time period (e.g., 0.2 second).

At step 216, the electronic control unit ECU sets the duty ratio Dce to the value selected in the step 215 and also sets another duty ratio to zero % for valves SI1, SI2. At step 217, the electronic control unit ECU judges if the time period Te has elapsed. If the time period Te has not yet elapsed, electronic control unit ECU returns to the main routine shown in FIG. 3. On the other hand, if the time period Te has elapsed, the electronic control unit ECU executes step 218 to set the control flag FL to a resting flag F0. After executing step 218, the electronic control unit ECU returns to the main routine shown in FIG. 3.

If the starting condition is not satisfied at the step 202, the electronic control unit ECU executes step 219 to check if the control flag FL is set to the termination flag F3. If the control flag FL is equal to the termination flag F3, the electronic control unit ECU executes steps 216, 217 and 218 as described above and returns to the main routine shown in FIG. 3.

If the electronic control unit ECU determines in step 219 that the control flag FL is not set to the termination flag F3, the electronic control unit ECU returns to the main routine shown in FIG. 3 because the control flag FL indicates the resting mode (i.e., a non-controlling mode).

Figure 5:
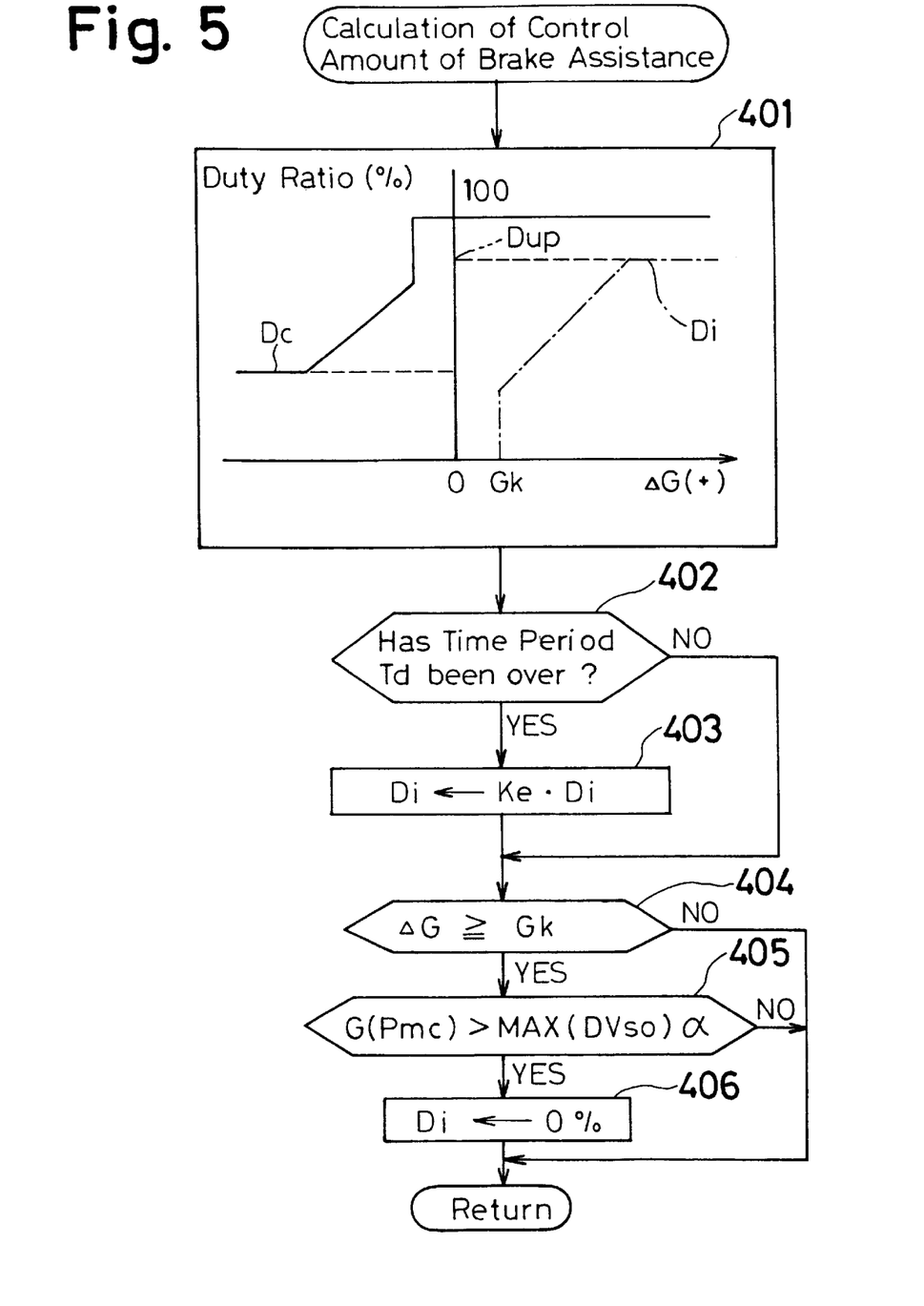
FIG. 5 is a flow chart showing the variable calculations for brake assist control which forms a part of the flow chart of FIG. 4.

FIG. 5 is a flow chart illustrating the routine carried out in connection with the calculation of the control amount of the brake assistance. At step 401, the electronic control unit ECU calculates duty ratios Di and Dc for the valves SI1, SI2, SC1 and SC2 based on the supplemental vehicle body deceleration ΔG. While the brake pressure is increased and the supplemental vehicle body deceleration ΔG is positive, the duty ratio Di for the valves SI1, SI2 is set in proportion to the supplemental vehicle body deceleration ΔG and the duty ratio Dc is set to nearly 100% to substantially close the valves SC1, SC2. Here, while the supplemental vehicle body deceleration ΔG is in the range between zero and a constant Gk (i.e., 0<ΔG<Gk), the duty ratio Di is set to zero % to close the valves SI1, SI2. While the brake pressure is decreased and the supplemental vehicle body deceleration ΔG is negative, the duty ratio Dc for the valves SC1, SC2 is set in proportion to the supplemental vehicle body deceleration ΔG and the duty ratio Di is set to nearly zero % to substantially close the valves SI1 and SI2. Further, the duty ratio Di for the valve SI1 and SI2 has an upper limit Dup so that the duty ratio Di does not exceed the upper limit Dup regardless of the supplemental vehicle body deceleration ΔG. Due to the upper limit Dup, the hydraulic pumps HP1, HP2 can avoid drawing in an excessive amount of brake fluid from the master cylinder MC. Therefore, the brake pedal BP may not sink regardless of the driver's operation. Further, output pressure Pmc from the master cylinder MC can be stabilized.

At step 402, the electronic control unit ECU judges if a time period Td has elapsed. The time period Td is a target time length after the initial time period (i.e., after execution of step 207). At step 403, during the time period Td, the electronic control unit ECU multiplies the duty ratio Di with a constant Ke (Ke<1, e.g., Ke=0.5) for the valves SI1 and SI2. Accordingly, the duty ratio Di for the valves ST1 and SI2 is limited up to, for example, 50%. In other words, the electronic control unit ECU does not use the duty ratio Di set at the step 401 just after the initial time period but executes a gain down control to reduce the duty ratio Di by 50% during the time period Td.

At step 404, the electronic control unit ECU judges if the supplemental vehicle body deceleration ΔG is greater than or equal to the constant Gk. If the supplemental vehicle body deceleration ΔG is greater than or equal to the constant Gk, the electronic control unit ECU executes step 405 to judge whether a vehicle body deceleration G(Pmc) is greater than a sum of the maximum value MAX(DVSO) and a constant. Here, the vehicle body deceleration G(Pmc) is an estimated vehicle body deceleration from the output pressure Pmc from the master cylinder MC. Further, the constant α is set to prevent hunting from occurring or being generated. If the condition at step 405 is satisfied, the electronic control unit ECU executes step 406 to set the duty ratio Di to zero % so that the valves SI1 and SI2 are closed. In case either one of the conditions in steps 404 and 405 is not satisfied, the electronic control unit ECU returns to the subroutine shown in FIG. 4.

In this embodiment, anti-skid control is performed when the brake pressure in one of the wheel cylinders Wfr, Wfl, Wrr, Wrl exceeds a brake pressure corresponding to the peak of the road surface frictional coefficient μ. While the brake assist control is performed, the brake pressures in the wheel cylinders Wfr, Wfl, Wrr, Wrl are always higher than the output pressure Pmc from the master cylinder MC. Accordingly, the vehicle body deceleration G(Pmc) estimated from the output pressure Pmc is always larger than the maximum value MAX (DVSO) estimated at the step 221 from the brake pressures after the anti-skid control has started. If the condition at step 405 is satisfied (i.e., the output pressure Pmc happens to lock one of the wheels FR, FL, RR, RL), the duty ratio Di is set to zero % at step 406. In other words, unless the condition at step 405 is satisfied (i.e., when the output pressure Pmc is not of a value causing the wheels FR, FL, RR, RL to lock), the duty ratio Di is set at the step 401. Therefore, the brake assist control is performed in accordance with the driver's brake operation.

It is to be understood that the condition at the step 405 can be modified. For example, the maximum value MAX(DVso) may be replaced by the maximum value detected by the fore-aft acceleration sensor during anti-skid control and/or brake assist control. Also, the maximum value MAX (DVso) may be replaced by the maximum value converted from the estimated brake pressures in the wheel cylinders Wfr, Wfl, Wrr, Wrl. Furthermore, at the step 405, the output pressure Pmc may be compared with the maximum brake pressure in the wheel cylinders Wfr, Wfl, Wrr, Wrl.

Figure 6:
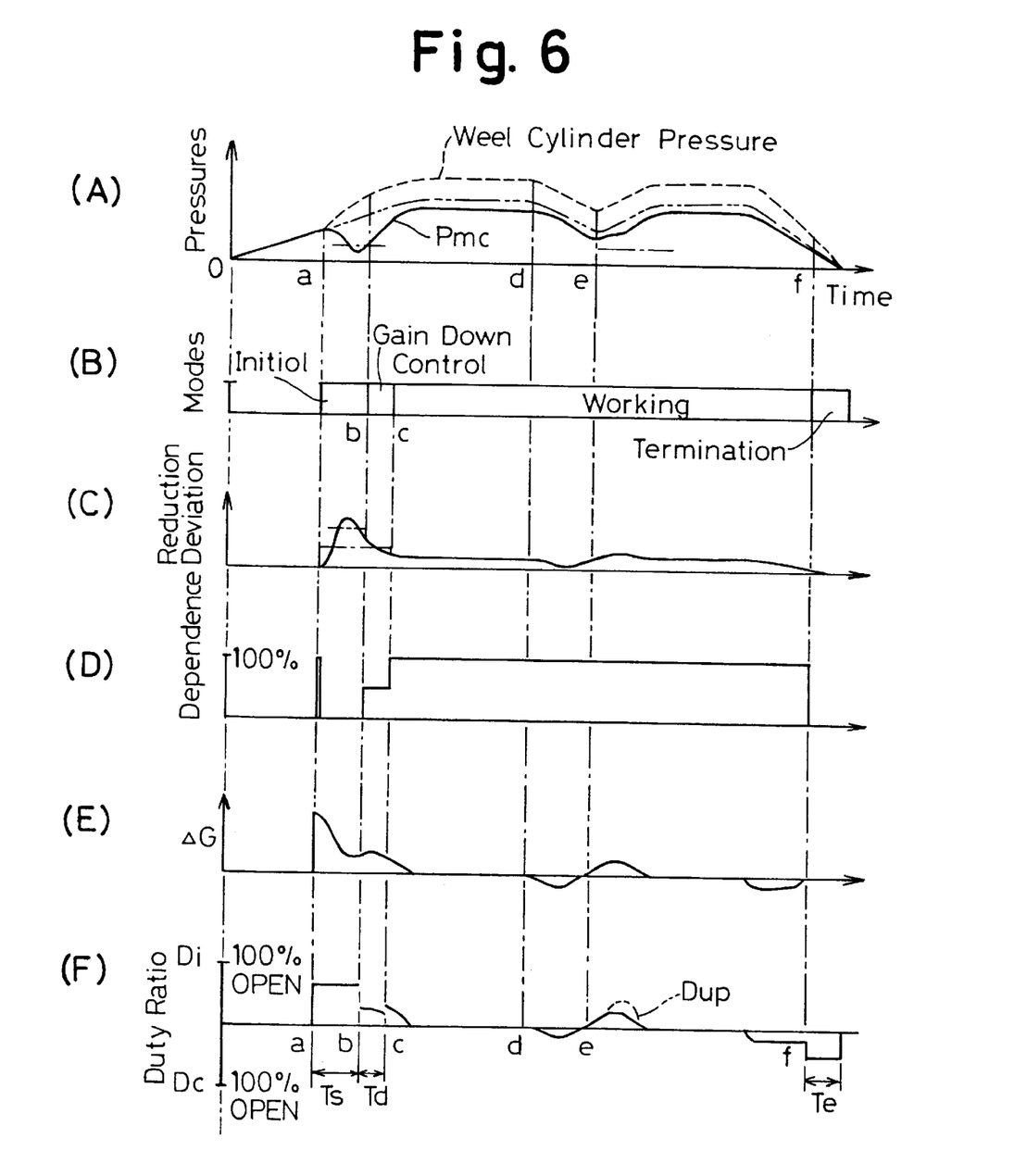
FIGS. 6(a)–6(f) are timing charts showing various transitions of the brake assist control.

FIGS. 6(A)=6(F) are timing charts showing the brake assist control. The chart in FIG. 6(A) shows the transition of the output pressure Pmc from the master cylinder. The output pressure Pmc substantially corresponds to the driver's operation of the brake pedal BP. The solid line shows an exemplary transition of the output pressure Pmc under the brake assist control whereas the two-dot chain line shows an exemplary transition without brake assist control. The broken line shows an exemplary transition of the brake pressure in one of the wheel cylinder Wfr, Wfl, Wrr, Wrl under brake assist control.

The chart in FIG. 6(B) shows the control modes of the brake assist control. In the chart of FIG. 6(B), the brake assist control starts from the resting period, the initial time period, the gain down control period, the working period, the termination period and the resting period.

The chart in FIG. 6(C) shows an exemplary reduction deviation of the output pressure Pmc from the master cylinder MC due to brake assist control. The chart in FIG. 6(D) shows the dependent rate on the pressure sensor PS under the brake assist control. The chart in FIG. 6(E) shows an exemplary transition of the supplemental vehicle body deceleration AG. The chart in FIG. 6(F) shows exemplary transitions of the duty ratios Di and Dc for the valves SI1, SI2, SC1 and SC2.

In FIGS. 6(A)–(F), the initial time period is begun at point (a) where the output pressure Pmc and the change rate DPMC exceed the predetermined values. Then, during the time period Ts or between the point (a) and a point (b), the duty ratio Dig for the valves SI1 and SI2 is maintained at the constant value selected from the map. After the initial time period Ts has been completed at point (b), the gain down control is performed so that the duty ratio Di is limited to 50% of the originally selected value during the time period Td or between point (b) and point (c).

Then, the brake pressure control is performed during the working period or between point (c) and point (f) so that the duty ratios Di and Dc are set to proper values in proportion to the supplemental vehicle body deceleration ΔG. In other words, the valves SI1, SI2, SC1 and SC2 are alternatively opened and closed based on the duty ratios Di and Dc so that the brake pressure (shown by the dotted line in the chart of FIG. 6(A)) in the wheel cylinder is higher than the output pressure Pmc (shown by the two-dot chain line in the chart of FIG. 6(A)). In the chart of FIG. 6(A), the pressure difference between the dotted line and the two-dot chain line is a constant. However, the actual output pressure Pmc follows the solid line in the chart of FIG. 6(A) so as to be smaller than the two-dot chain line because the brake fluid is drawn in by the hydraulic pumps HP1 and HP2.

When the driver slightly releases the brake pedal BP at a point (d), the supplemental vehicle body deceleration $\Delta G$ becomes negative (i.e., zero (0) acceleration). Further, when the driver further depresses the brake pedal BP at point (e), the supplemental vehicle body deceleration $\Delta G$ is increased. Further, the duty ratio Di is also increased for the valves ST1 and SI2 as the supplemental vehicle body deceleration $\Delta G$ increases. If the duty ratio Di was increased like the dotted line shown in the chart of FIG. 6(F), the output pressure Pmc would be decreased like the dotted line around point (e) in the chart of FIG. 6(A) due to an increased amount of brake fluid drawn in by the hydraulic pumps HP1 and HP2. This causes less counter force to the brake pedal BP so that the driver may feel that something is wrong. To prevent this, the duty ratio Di is limited so as not to exceed the upper limit Dup as shown by the solid line in the chart of FIG. 6(F) around point (e). Then, when the output pressure Pmc becomes less than the predetermined value at point (f), the termination period Te is begun so that the duty ratio Dce is selected from the map for the valves SC1 and SC2. After the termination period Te, the brake assist control is in the resting period.

Figure 7:
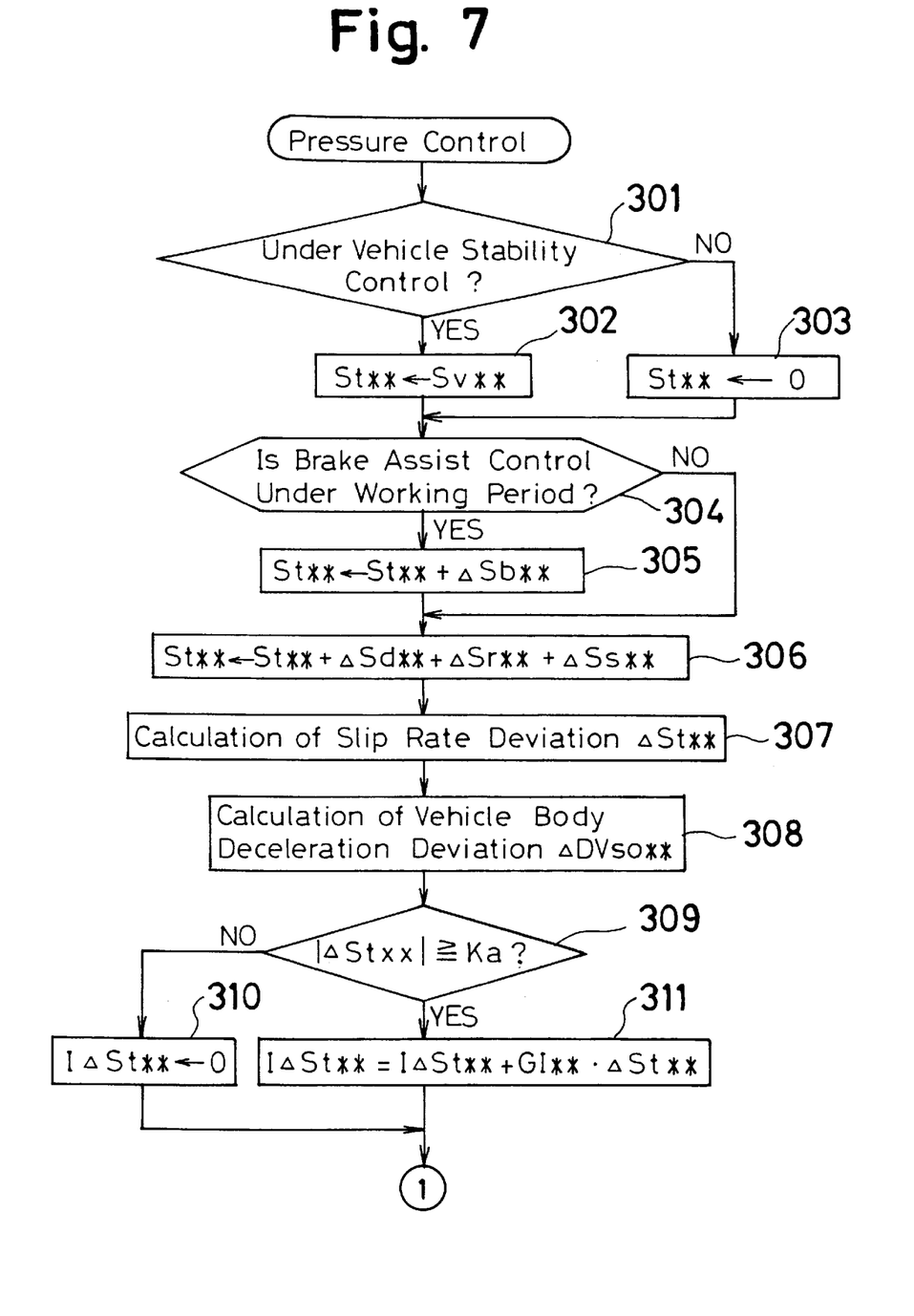
FIG. 7 is a portion of a flow chart showing pressure control which forms a part of the flow chart depicted in FIG. 3.
Figure 8:
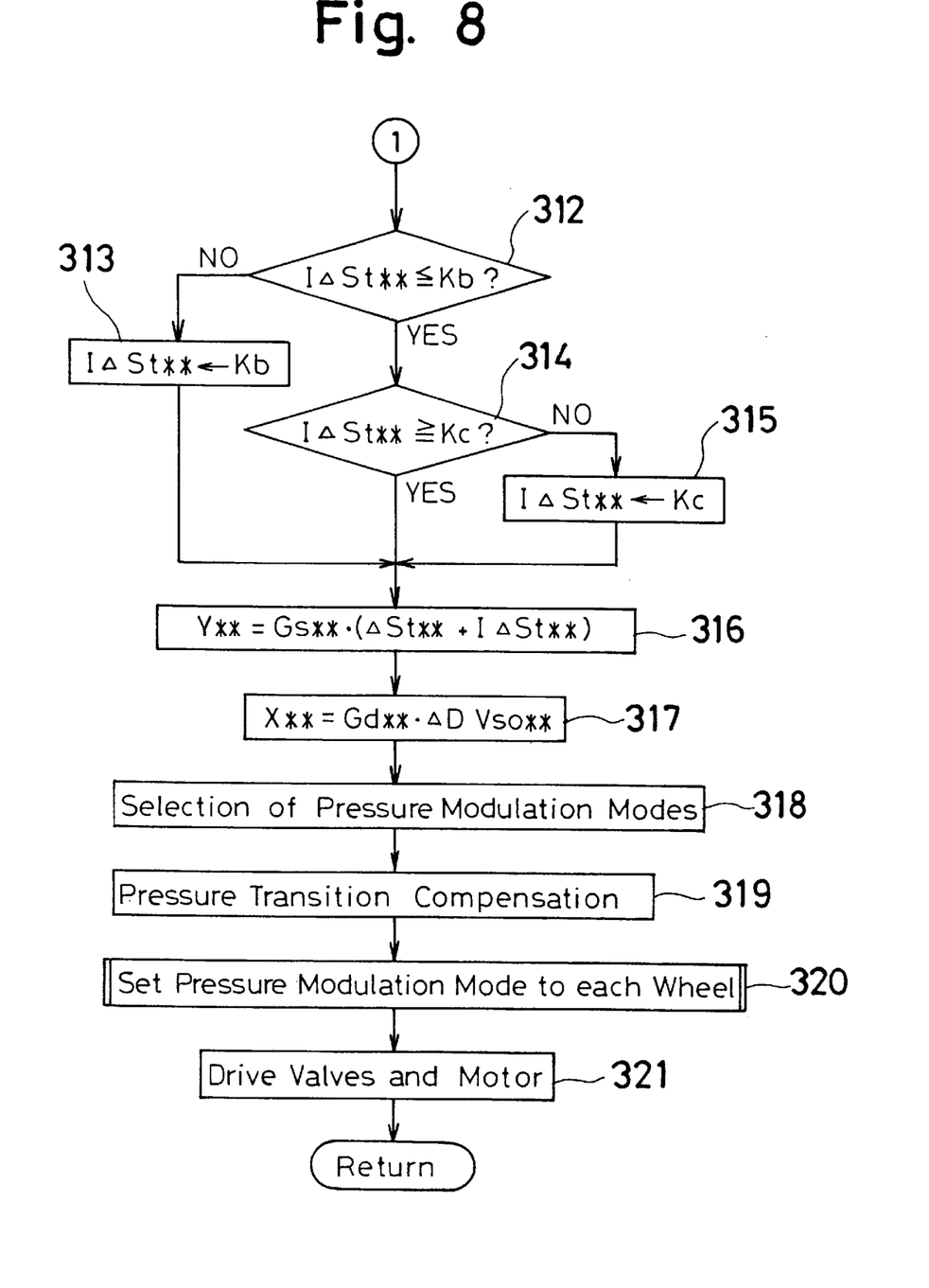
FIG. 8 is the other portion of the flow chart showing pressure control which forms a part of the flow chart depicted in FIG. 3.

Referring now to FIGS. 7 and 8, the pressure control of the present embodiment is explained in detail. The pressure control shown in FIGS. 7 and 8 corresponds to step 109 in FIG. 3. In the pressure control, the brake pressures in the respective wheel cylinders Wfr, Wfl, Wrr, Wrl are controlled.

At step 301, the electronic control unit ECU judges if the vehicle stability control is being performed. If vehicle stability control is being performed, the electronic control unit ECU executes step 302 to set a predetermined target slip rate Sv for each of the target slip rates St for the wheels FR, FL, RR, RL. If the vehicle stability control is not being performed at step 301, the electronic controller ECU executes step 303 to set each of the target slip rates St to zero. At step 304, the electronic control unit ECU judges if the brake assist control is in the working period (i.e., if the control flag FL=F2). If the brake assist control is in the working period, the electronic control unit ECU executes step 305 to add a slip rate compensator $\Delta$Sb to each of the target slip rates St. At step 306, the electronic control unit ECU calculates the sum of a fore-aft distribution compensator $\Delta$sd, a slip rate compensator $\Delta$Sr for traction control and a slip rate compensator $\Delta$Ss for anti-skid control, and then adds the calculated sum to each of the target slip rates St. The fore-aft distribution compensator $\Delta$Sd, the slip rate compensator $\Delta$srfor traction control and the slip rate compensator $\Delta$Ssfor anti-skid control are set to zero while the related controls are not being performed.

At step 307, the electronic control unit ECU calculates a slip rate deviations $\Delta$st for the respective wheels FR, FL, RR, RL. At step 308, the electronic control unit ECU calculates a vehicle body deceleration deviation $\Delta$DVso. The slip rate deviations $\Delta$St are the differences between the target slip rates St and the actual slip rates Sa (i.e., $\Delta$st=St−Sa). The body acceleration deviations $\Delta$DVso are the differences between the vehicle body deceleration DVso and the wheel accelerations DVw (i.e., $\Delta$DVso=DVso−DVw). The actual slip rates Sa and the body acceleration deviations $\Delta$DVso may take various values under various controls as known in the art, and so a detailed explanation is omitted.

At step 309, the electronic control unit ECU compares the slip rate deviations $\Delta$St with a constant Ka. If the absolute value of the slip rate deviations $\Delta$St is greater than or equal to the constant Ka, the electronic control unit ECU executes step 311 to renew an integration I$\Delta$ST of the slip rate deviations $\Delta$St. In other words, the present integrations I$\Delta$ST are the sum of the last integration I$\Delta$ST and the product resulting from multiplying the present slip rate deviation $\Delta$St and the gain GI. In case the absolute values of the slip rate deviations $|\Delta$St$|$ is less than the constant Ka, the electronic control unit ECU clears the integration I$\Delta$ST at step 310. At steps 312, 313, 314 and 315, the integrations I$\Delta$ST are limited in a range between the upper limit Kb and the lower limit Kc (i.e., Kc≦I$\Delta$St≦Kb). At step 313, the electronic control unit ECU sets the integration I$\Delta$ST to the upper limit Kb if the integration I$\Delta$St exceeds the upper limit Kb. At the step 315 the electronic control unit ECU also sets the integration I$\Delta$St to the lower limit Kc if the integration I$\Delta$St is less than the lower limit Kc.

At step 316, parameters Y are calculated through use of the formula: Y=Gs·($\Delta$St+I$\Delta$St) for various brake pressure controls. At step 317, additional parameters X are calculated through use of the formula: X= Gd·$\Delta$DVso. Here, the gains Gs and Gd** are predetermined values.

Figure 10:
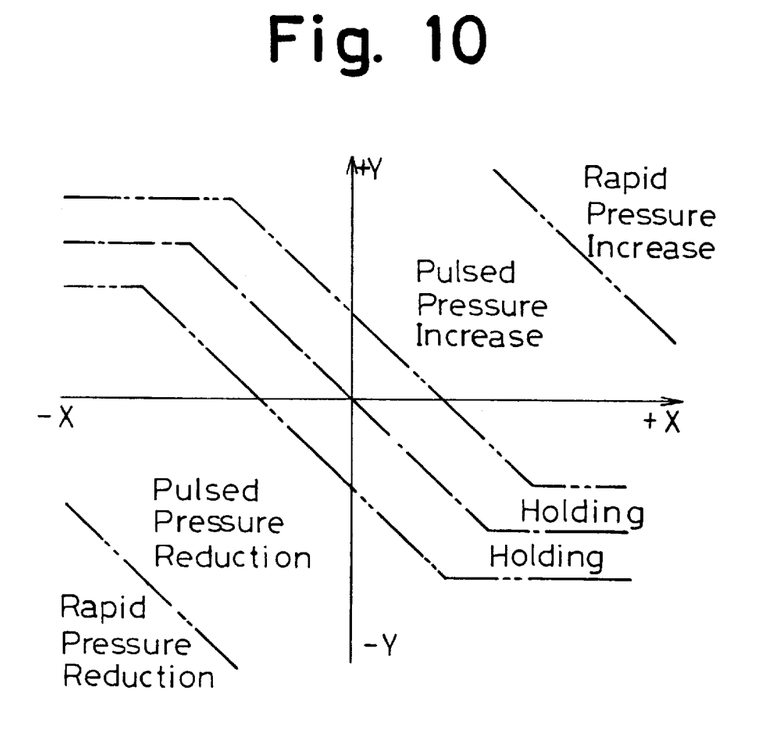
FIG. 10 is a graph showing the relationship between pressure modulation modes and parameters for brake pressure control.

At step 318, the electronic control unit ECU selects one of the pressure modulation modes shown in FIG. 10 based on the parameters X and Y. FIG. 10 is a graph showing the relationship between pressure modulation modes and parameters X, Y for brake pressure control. Based on the parameters X and Y, the electronic control unit ECU selects one of the following areas: a rapid pressure reduction area, a pulsed pressure reduction area, holding areas, a pulsed pressure increase area, and a rapid pressure increase area. In case none of the brake pressure controls is being performed, no pressure modulation mode is selected.

In case the pressure modulation mode is switched from reduction to increase or from increase to reduction, the electronic control unit ECU executes step 319 to achieve a smooth brake pressure transition. For example, when the electronic control unit ECU switches the pressure modulation mode from the rapid reduction mode to the pulse increase mode, the rapid increase mode is first performed for a time period depending on the duration of the last rapid reduction mode. At step 320, the selected pressure modulation modes are set for each wheel FR, FL, RR, RL with relation to the other wheels. For example, in case the electronic control unit ECU employs a so called low-select method for the rear wheels RR, RL, the electronic control unit ECU controls the brake pressure based on the lower speed wheel.

At step 321, the electronic control unit ECU drives the valves SI1, SI2, SC1, SC2 and the electric motor M based on the duty ratios Di and Dc determined at steps 205, 212 and 216. When the vehicle body deceleration G(Pmc) is greater than the sum of the maximum value MAX(DVso) and the constant α at step 404 in FIG. 5, the electronic control unit ECU maintains the valves SI1, SI2, SC1, SC2 closed and also maintains the driving of the electric motor M so that the brake assist control is continuously performed. Although the valves SI1 and SI2 are closed, if necessary, brake fluid may be supplied to the wheel cylinders Wfr, Wfl, Wrr, Wrl through the one-way valves AV1, AV2.

At the step 321, the electronic control unit ECU also drives the modulator valves PC1, PC2, PC3, PC4, PC5, PC6, PC7, PC8 to adjust the braking forces of the wheels FR, FL, RR, RL.

In the present invention, the electronic control unit ECU closes the second valves SI1 and SI2 while the pressure sensor PS detects the pressure Pmc over a certain pressure determined by the road surface condition. Therefore, the hydraulic pumps are able to discharge the brake fluid from the reservoirs RS1, RS2 while the brake assistance control and the anti-skid control are simultaneously performed.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A brake control apparatus comprising:

a wheel cylinder for applying a braking force to a wheel;

a master cylinder for generating pressurized brake fluid according to operation of a brake pedal;

a main line connecting the master cylinder to the wheel cylinder;

a modulator disposed in the main line to control pressure in the wheel cylinder;

a reservoir connected to the wheel cylinder through the modulator and to which the brake fluid from the modulator returns directly;

a first valve for opening and closing the main line between the master cylinder and the modulator;

a pump having an inlet side and an outlet side, the pump being connected to the reservoir at its inlet side and being connected to the main line between the first valve and the modulator at its outlet side;

an auxiliary line connecting the inlet side of the pump to an outlet side of the master cylinder;

a second valve for opening and closing the auxiliary line independently of the first valve;

a pressure sensor for detecting an output pressure from the master cylinder; and a controller which controls the first valve, the second valve and the pump based upon the pressure detected by the pressure sensor so that the wheel cylinder receives a higher pressure than that of the master cylinder, the controller closing the second valve when the wheel cylinder receives higher pressure than that of the master cylinder and the output pressure at the master cylinder locks the wheels.

2. The apparatus according to claim 1, further comprising:

first calculation means for calculating a first estimated vehicle body deceleration based on the pressure detected by the pressure sensor;

a wheel speed sensor for detecting a wheel speed of the wheel; and second calculation means for calculating a second estimated vehicle body deceleration based on the wheel speed detected by the wheel speed sensor, said controller closing the second valve when the first estimated vehicle body deceleration exceeds the second vehicle body deceleration.

3. The apparatus according to claim 2, wherein the controller also closes the first valve and continues to drive the pump.

4. The apparatus according to claim 2, wherein the second body deceleration is the maximum value within a predetermined time period.

5. The apparatus according to claim 2, wherein the controller sets a target deceleration based on an output pressure from the master cylinder, and the controller determines a difference between the target deceleration and the vehicle body deceleration.

6. The apparatus according to claim 5, wherein the controller closes the first valve when the target acceleration is larger than the vehicle body deceleration and said difference between the target deceleration and the vehicle body deceleration is positive.

7. The apparatus according to claim 1, wherein the controller closes the second valve when the pressure sensor detects the pressure over a certain pressure determined by road surface conditions.

8. The apparatus according to claim 1, including a one-way valve connected in parallel with the first valve to supply brake fluid from the master cylinder to the modulator.

* * * * *